United States Patent [19]
von Ohain et al.

[11] 3,711,370
[45] Jan. 16, 1973

[54] COLLOIDAL-GAS CORE REACTOR

[75] Inventors: Hans J. P. von Ohain, Dayton, Ohio; Melvin R. Keller, Pittsburgh, Pa.

[73] Assignee: The United States of America as represented by the Secretary of the Air Force

[22] Filed: Jan. 13, 1970

[21] Appl. No.: 2,597

[52] U.S. Cl. ..........................176/45, 60/203, 176/39
[51] Int. Cl. ..............................................G21c 3/44
[58] Field of Search .........176/45, 39, 52, 60; 60/203

[56] References Cited

UNITED STATES PATENTS

| | | | |
|---|---|---|---|
| 3,270,496 | 9/1966 | Rom | 176/39 X |
| 3,399,534 | 9/1968 | Hunter et al. | 60/203 |
| 3,546,069 | 12/1970 | McLafferty | 176/52 |

OTHER PUBLICATIONS

Astronautics, Oct. 1959, pp. 20–25, 46, 48, 50, 102–105.

*Primary Examiner*—Carl D. Quarforth
*Assistant Examiner*—Harvey E. Behrend
*Attorney*—Harry A. Herbert, Jr. and Richard J. Killoren

[57] ABSTRACT

A colloidal-gas core nuclear reactor having a high tensile strength outer semispheroidal pressure shell enclosing a moderator body member which surrounds a central cavity with an expanding exit nozzle at one end thereof. The cavity wall has a gradually increasing radius from the nozzle end in a direction upstream within the cavity. A hydrogen gas manifold is positioned at the maximum radius of the cavity and supplies gas to the cavity through a plurality of annularly positioned swirl vanes. Additional hydrogen gas is supplied to the cavity with a tangential component through nozzles positioned in a plurality of positions of the cavity wall adjacent the exit nozzle to prevent the flow of nuclear particles along the forward wall boundary layer to the exit nozzle.

8 Claims, 9 Drawing Figures

Fig-1
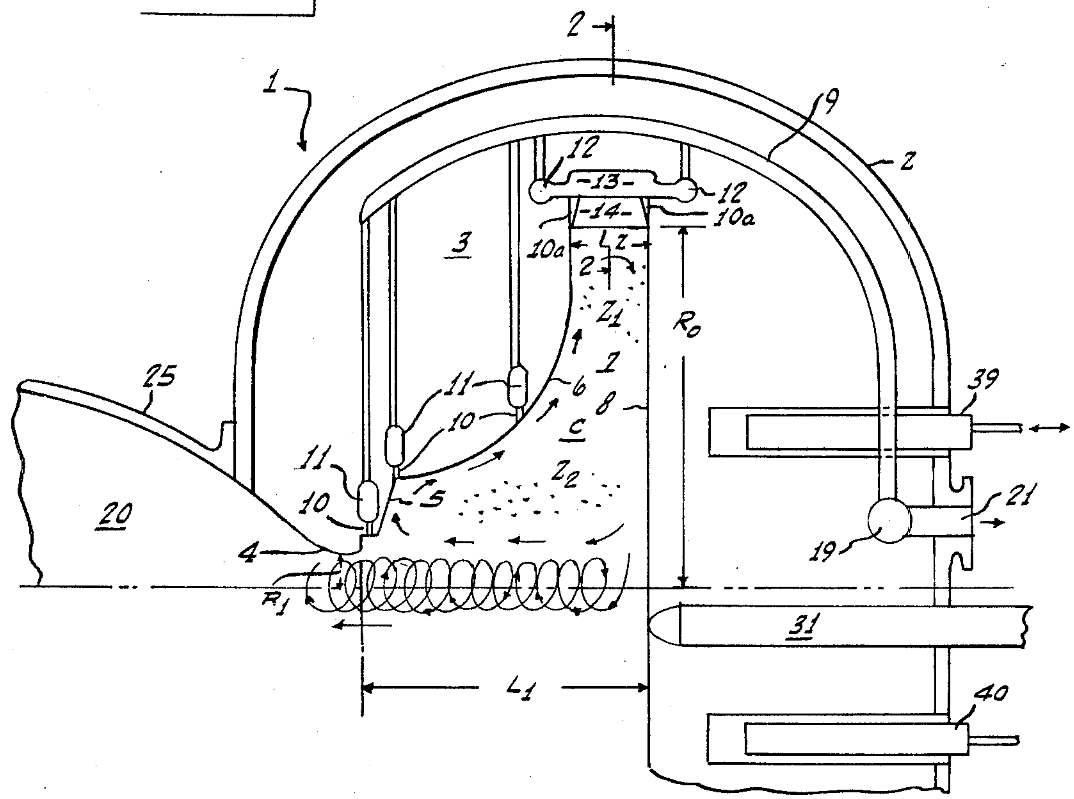
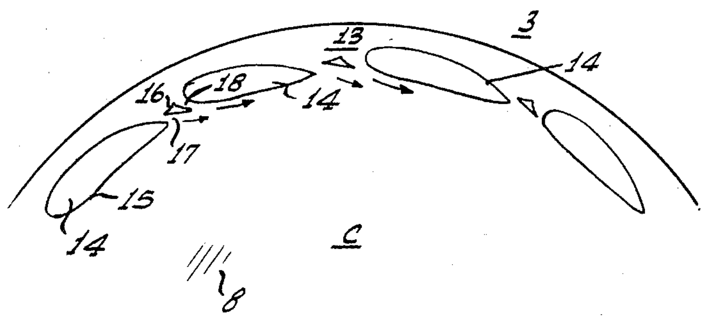
Fig-2
INVENTORS
HANS J. P. VON OHAIN
MELVIN R. KELLER
BY Harry A. Herbert Jr
ATTORNEY
Richard J Killoren
AGENT

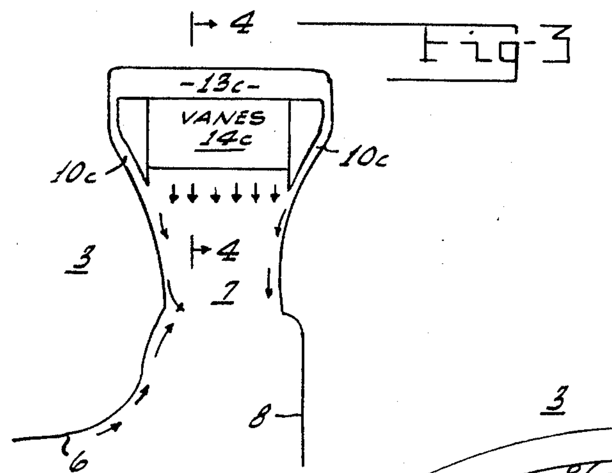
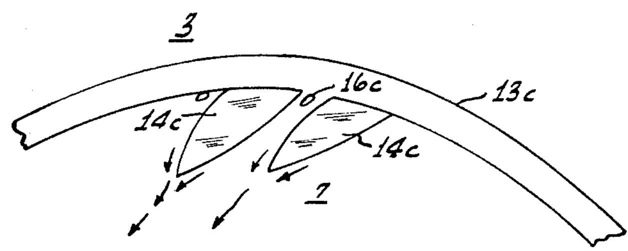
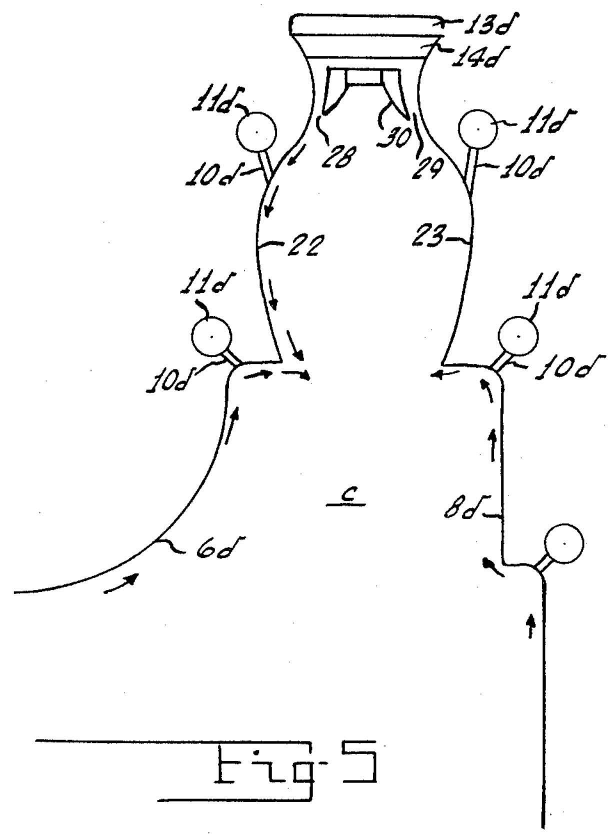
INVENTORS
HANS J.P. VON OHAIN
MELVIN R. KELLER
BY Harry A. Herbert Jr
ATTORNEY
Richard J. Killoren
AGENT INVENTORS
HANS J. P. VON OHAIN
MELVIN R. KELLER
BY Harry A. Herbert Jr
ATTORNEY
Richard J. Killoran
AGENT INVENTORS
HANS J. P. VON OHAIN
MELVIN R. KELLER
BY Harry A. Herbert Jr
ATTORNEY
Richard J Killoren
AGENT

COLLOIDAL-GAS CORE REACTOR

BACKGROUND OF THE INVENTION

The present invention relates to an improved colloidal gas core reactor for rocket propulsion employing nuclear power. In such devices, first proposed in the 1950's, a reactor chamber of generally cylindrical shape is lined with graphite surrounded by thick walls of beryllium and with an outer shell of steel. The beryllium is provided with regenerative cooling passages terminating in a large number of parallel passages adapted to supply essentially tangential injection orifices in the reactor chamber inner walls. Liquid hydrogen under high pressure is supplied to cooling passages and discharges in gaseous form tangentially into the reaction chamber. The gaseous hydrogen intimately contacts a cloud of uranium gas present in a critical mass and undergoing nuclear fission. The hydrogen would form a vortex flow which would have a very high velocity along the chamber axis and centrifuge out any gaseous uranium fuel which would tend to be discharged with the hot clean hydrogen gas which passes from the swirl chamber and is expanded in a conventional rocket nozzle to produce thrust. The axis of the rocket nozzle being common with the axis of the swirl chamber the finely divided uranium fuel, due to vortex flow action, would tend to be suspended in a doughnut-shaped cloud. Studies indicate that such a reactor was theoretically feasible only in prohibitively large sizes because of the problems of avoidance of contact of the fissionable material with the cavity walls.

It has been determined that a practical nuclear powered rocket propulsion system has the following characteristics:

Goal: Small cavity, high specific impulse (ISP – about 1,100 second) favorable thrust to weight ratio (about 10:1), relatively small thrust level (of the order of magnitude of 10,000 pounds).

Achieving criticality in a small cavity (having for example an inner diameter of 3 feet) requires a high loading of fissionable substance (about 30 – 40 pounds). Such a loading corresponds to a large ratio of fissionable mass to mass of expellant gas within reactor (of the order of magnitude 100:1). The small fuel mass fragments may be uranium droplets in equilibrium with saturated vapor, or may be droplets of a uranium compound having a very low vapor pressure, or may be uranium compounds in solid state (dust).

Under such high loading conditions, it is impossible with known techniques to satisfy the conflicting requirements of confining the fuel within the reactor cavity and, at the same time, prevent the fuel from getting in contact with the inner surfaces of the cavity.

SUMMARY OF THE INVENTION

In accordance with the invention, these problems are solved by the characteristics of the geometry of the reactor cavity and by the method of admitting the expellant gas into the cavity. The cavity is shaped to have a length at its outer radius which is less than one-half the outer radius and also less than one-half the length of the cavity near the center thereof and to have the nozzle throat diameter much less than the length of the cavity near the center. Gas is injected along the forward wall, that is, the wall containing the nozzle opening to prevent particles leaving the chamber through the boundary layer. Particles are permitted to follow the boundary layer at the rearward wall to produce greater mixing of the gas and particles to increase the heat exchange to the gas.

BRIEF DESCRIPTION OF THE DRAWINGS

FIG. 1 represents a schematic side elevational view partly in section illustrating the geometry of the reactor cavity and the general scheme for injection of the expellant gas;

FIG. 2 is a view at right angle to FIG. 1 illustrating the preferred injection system of the major diameter of the cavity;

FIG. 3 is an alternative arrangement of the nozzle injection means of FIG. 2;

FIG. 4 is a view of the vanes of FIG. 3 at right angle to the showing in FIG. 3;

FIG. 5 illustrates a modified upper cavity side wall configuration with injection means in the zone of high fuel loading;

DETAILED DESCRIPTION OF THE INVENTION

Figure 6:
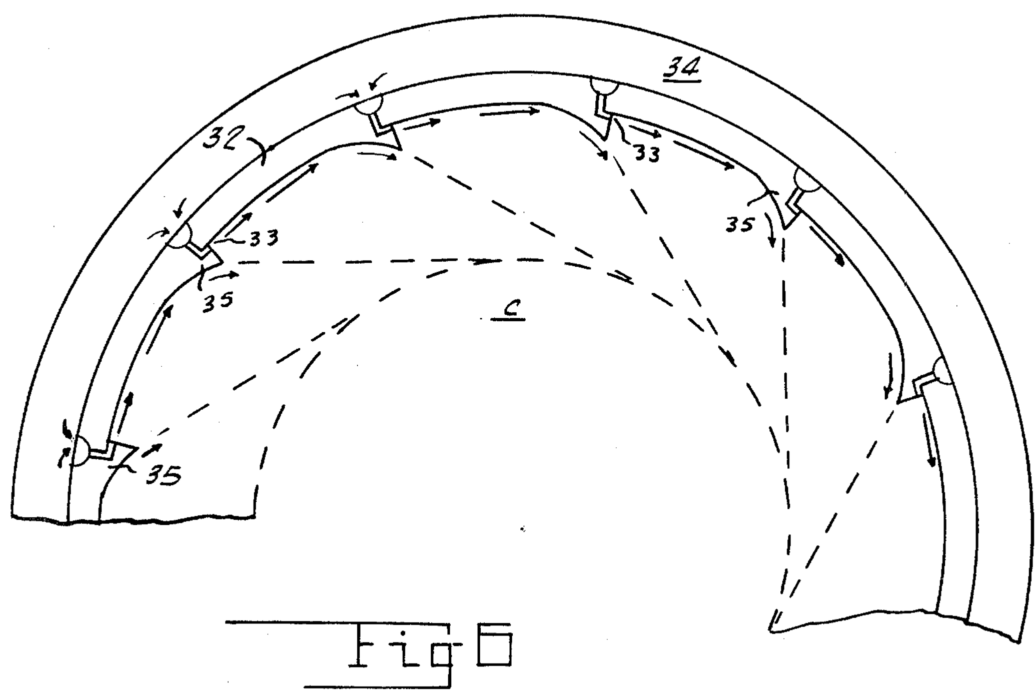
FIG. 6 is a schematic side view illustrating a different cavity geometry employing ramps and injection means.

With reference to the devices illustrated in FIGS. 1 and 2, the reference numeral 1 generally indicates a dust core reactor in accordance with the invention and provided with an outer semispheroidal pressure shell of very high tensile strength material such as steel or tungsten. In FIG. 1, only the upper half of the structure is shown which, however, is symmetrical about the horizontal centerline. The shell 2 encloses a moderator or reflector which preferably is made of metallic beryllium and, while shown as constructed of one piece, preferably is made of a number of parts suitably secured together to form a unitary whole. The moderator body 3 is provided with a number of regenerative cooling passages preferably connected in series and adapted to have an expellant in the form of liquid hydrogen forced therethrough and to maintain by regenerative cooling the reactor parts within safe temperature limits. For the sake of clarity, the regenerative cooling passages are shown only schematically at 9, and are connected to an inlet manifold 19 in turn connected by a conduit passage 21 to a suitable external tank of liquid hydrogen under high pressure.

The moderator body 3 has a reactor cavity C centrally formed therein and in which cavity a critical amount of uranium or uranium compound of the type previously mentioned is contained. The uranium being present in the form of tiny droplets of molten uranium or powdered uranium compound capable of undergoing a fission reaction when a definite critical mass of the material is present. The reactor cavity C is contoured as at 4 to form a constricted throat for a rocket nozzle. It is then contoured with a radially tapered wall section 5 joined to a concave section 6 which terminates in a radially extending wall portion defining the front wall of an annular zone 7 which is completed by a radially extending back wall 8. The length $L_2$ of the cavity is less than $0.5R_0$ and also less than $0.5L_1$, where $L_1$, $L_2$ and $R_0$ are as shown in FIG. 1. Also the nozzle throat radius $R_1 << L_1$. It will be noted that in cross section the shape of the cavity C is very similar to that of the conventional centrifugal blower impeller.

A plurality of nozzles 10 are provided and which are arranged in a circumferential ring the nozzles 10 each being individual passages inclined so as to give a tangential component about the central axis of the reactor to gas discharge therefrom. Each row of nozzles 10 connect to an annular manifold passage 11 each of which in turn is connected by passages 9 to receive hydrogen gas under high pressure derived from the regenerative cooling system. The nozzles 10 in addition to delivering high velocity jets of hydrogen to the reactor chamber C with a tangential component also direct the flow along the chamber wall. The gas discharged adjacent the nozzle throat 4 tends to form a boundary layer of relatively cool gas over the rocket nozzle throat to protect the same from burn out. At its major radial diameter the reactor cavity C terminates in an annular manifold passage 13 adapted to be supplied with gaseous hydrogen under high pressure from manifold passages 12 in turn adapted to be connected to the regenerative supply of liquid hydrogen used as the expellant gas by suitable passage means not shown.

Reactive material may be supplied to the apparatus through conduit 31 from a supply not shown. Any conventional control means for externally moderated reactors may be provided, for example, such as control rods 39 and 40.

When the device is placed in operation hydrogen gas under high pressure will be delivered to the annular manifold chamber 13. Shortly thereafter a critical amount of uranium or uranium compounds is supplied through conduit 31 to the reactor chamber C. The hydrogen gas under high pressure tends to enter chamber C past swirl vanes 14 as indicated in FIG. 1 and as shown in FIG. 2 of an airfoil type section with a pronounced convex curvature on the under camber thereof as indicated at 15. The vanes 14 are circumferentially spaced to provide for a triangular shaped flow divider 16 being placed between the trailing edge of one vane and the leading edge of an adjacent vane 14 so as to provide narrow nozzle-like passages 17 and 18 from which the hydrogen contained in the annular manifold face 13 can be ejected in thin high velocity fluid sheets which will have radial inward as well as tangential components. The high velocity jets discharged from the jet passages 17 and 18 sweep over the concave undersides 15 of the vanes 14 creating inwardly directed centrifugal force fields tending to repel any uranium particles which would tend to contact the walls of the chamber and the vanes themselves in the outer portion of the reactor cavity C in the high dust loading zone $Z_1$ such as indicated in FIG. 1.

The gaseous high velocity hydrogen jets admitted to the reactor chamber C because of their tangential components introduced from nozzles 17 and 18 between each of a pair of vanes 14 will set up a vortex flow within the reactor cavity C. The discharge from each of the ring of nozzles 10 will also impart a rotation to the gas charge entering the reactor cavity C. Because of the vortex action a very high rotational velocity will be imparted to the vortex core indicated in FIG. 1. Because of the high spin velocity of the vortex core all uranium particles contained therein will be centrifuged radially outward and will move from a low dust loading zone $Z_2$ as indicated in FIG. 1 radially outward to a high dust loading zone $Z_1$ as indicated in FIG. 1. In general, there will be a circulation of gas mixed with reacting powder axially along the vortex core and then turning radially inward along the walls 5 and 6 as seen in FIG. 1. The hydrogen jets tangentially issuing from the nozzle 10 create a high velocity layer over the walls 5 and 6 tending to keep the same cooled and further by virtue of curvature such as that of the wall 6 create a centrifugal force field tending to throw off any particles of reactive material tending to approach the wall. The reactive material tends to move radially outward into the high dust loading zone as indicated in FIG. 1 but in the manner well known in vortex phenomena then turns and moves radially inward along the radial wall 8 of the cavity C so that a constant circulation occurs in the manner as indicated by the arrows in FIG. 1 without the reactive material being enabled to contact the chamber walls. The vortex core containing no reactive material constantly moves to the left as seen in FIG. 1 and the clean hydrogen gas contained therein passes axially to the left through the constricted rocket nozzle throat 4 and expands into the nozzle chamber 20 defined by bell-shaped housing 25 secured to the pressure shell 2 by any suitable means. It will be obvious that the rate of discharge will be controlled by the rate at which liquid hydrogen gas is admitted to the dust core reactor. Because of the enormous amount of heat absorbed within the reactor cavity C the hydrogen gas expelled through the nozzle 4 may reach temperatures of the order of 4,000° K.

In the device of FIGS. 1 and 2 in order to prevent any dust contacting the upper side wall portion of the reactor cavity C, annular nozzles 10*a* may be positioned circumferentially around the chamber walls adjacent each end of the vanes 14. The nozzles 10*a* can direct high velocity hydrogen radially inward and which will be turned and merge with the flow otherwise as indicated by the arrows in FIG. 1. The device of FIG. 1 is characterized by the fact that all portions of the walls of the reactor cavity C are washed with high velocity streams of expellant gas and the walls of critical portions of the chamber are curved so that impinging gas streams will be thrown outward from the wall and by virtue of centrifugal force will impel all reactive dust particles in a direction radially away from the walls. It is thus possible to carry on an atomic fission process for heating an expellant gas by intimate mixture thereof with the fissioning material and to expel the gas from a rocket nozzle without carrying any of the reactive material into the nozzle.

In the device of FIGS. 3 and 4, the outer radial portion of the reactor cavity C of FIG. 1 in what would be the zone of high dust loading is made in the form of an annular converging passage with passages 10*c* on either side of the vanes 14*c* to deliver high velocity jets over the converging and convex curving walls to prevent contact of reactive material in the high dust loading zone from contacting the wall. The passages 10*c* are adapted to contact an annular manifold space 13*c* in the same manner as in the device of FIG. 1. As seen in FIG. 4 the vanes 14*c* are triangular shaped in cross section with the upper and lower chambers convex and with a shaped flow divider 16*c* between each adjacent pair of vanes. High pressure expellant gas is discharged as a pair of thin jets moving over the concave surfaces of the vanes 14*c* with tangential and radial components and with centrifugal force effects over the blade surfaces tending to throw any reactive material back into the high dust loading zone and preventing contact with the walls.

FIG. 5 illustrates a modified device of the type of FIG. 1 in which the chamber C has the radial outward portions thereof altered to be concave as indicated at 22 and 23, respectively, At its radial outermost point vanes 14*d* permit high pressure hydrogen from manifold space 13*d* to pass therethrough in the same manner as FIG. 1 so as to have the discharge include radial as well as tangential velocity components. The discharge, however, is led through narrow annular zones 28 and 29 formed by a central flow splitter body 30. The hydrogen is thus admitted at the radial outermost point and will tend to wash the walls at the upper end of the chamber to prevent any contact of the reactive material therewith. In the device of FIG. 5 circumferential sets of tangential jet nozzles 10*d* fed by annular channels 11*d* similar to nozzles 10 of FIG. 1 are employed to wash re-entrant corner portions of the walls.

FIG. 6 illustrates a ramp type injection means to replace the vanes 14 of FIGS. 1 and 2. In this Figure, the outer portion of the reactor cavity C is made with a solid transverse wall extending circumferentially around the entire cavity. The wall is indicated in FIG. 6 by reference numeral 32. A plurality of tangential nozzles 33 connected with a manifold source 34 similar to the manifold 13 of FIG. 1 supplies gaseous hydrogen at high velocity tending to blow off any reactive material trying to contact the chamber wall 32. Immediately in front of each nozzle 33 there is provided a transverse extending ramp 35 of generally triangular shape adapted to be impacted by the jet discharge of the preceding nozzle 33. The ramp may have a forward face curved as shown, a straight line shape or a convex curvature. The ramp directs the net discharge from each nozzle 33 with a radial inward component as well as tangentially. The downstream face of the ramps 35 intersect fluid discharged from the associated nozzle 33 and sufficient fluid washes thereover to prevent contact of reactive material with this face.

Figure 7:
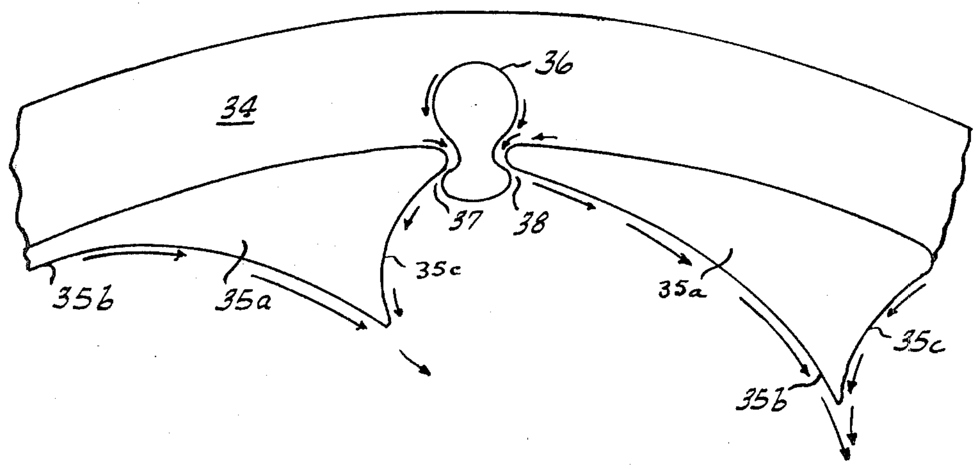
FIG. 7 is a view similar to FIG. 6 employing a different ramp arrangement.

In FIG. 7 there is shown a ramp injection system somewhat similar to that of FIG. 6 with the exception that the ramps indicated as 35*a* have both upstream faces 35*b* and downstream faces 35*c* thereof curved. The space between the trailing edge of one ramp and the leading edge of the adjacent ramp directly communicates with the hydrogen manifold space 34, which is the same as that of FIG. 6. This space is occupied by a flow divider 36 which is contoured to form two narrow injection passages or nozzle slots 37 and 38, respectively. The nozzle slot 37 injects relatively cool gas over the surface 35*c* to prevent contact of nuclear material with the ramp. Similarly, the nozzle slot 38 injects gas forwardly over the surface 35*b* of the adjacent ramp. The streams passing over the ramp surfaces 35*b* and 35*c* of each respective ramp merge at the ramp tip to form a single stream moving tangentially and radially inward as indicated in dotted lines in FIG. 7.

Figure 8:
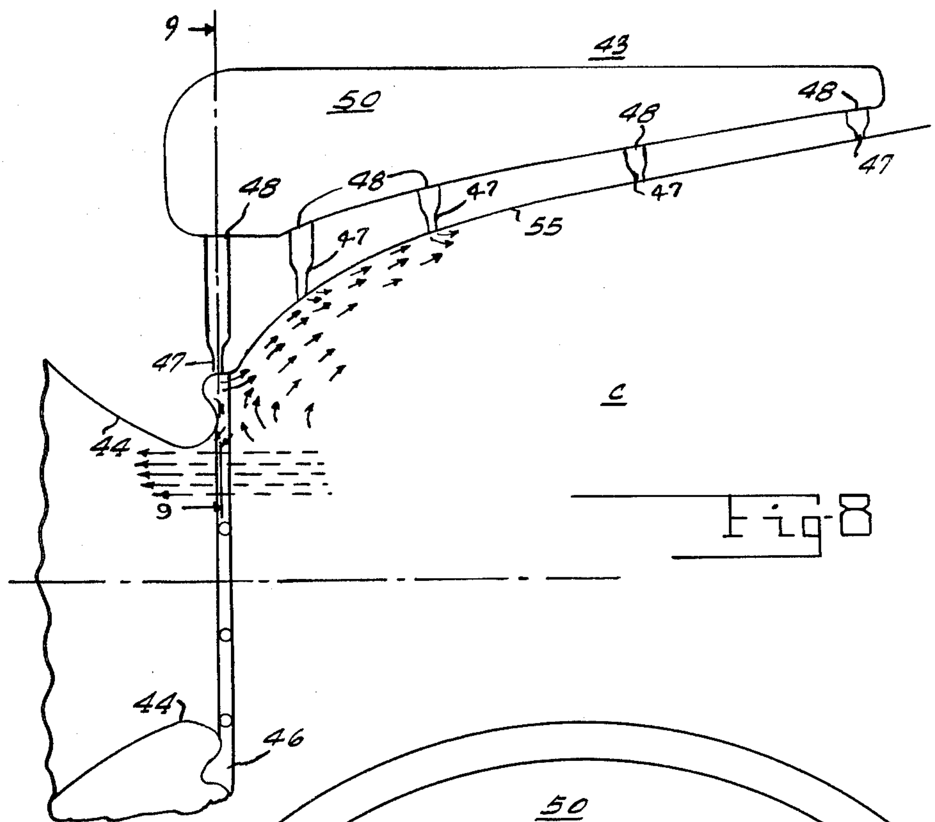
FIG. 8 is a fragmentary longitudinal schematic illustrating the preferred construction of the portions of FIG. 1 approaching the rocket nozzle throat section.
Figure 9:
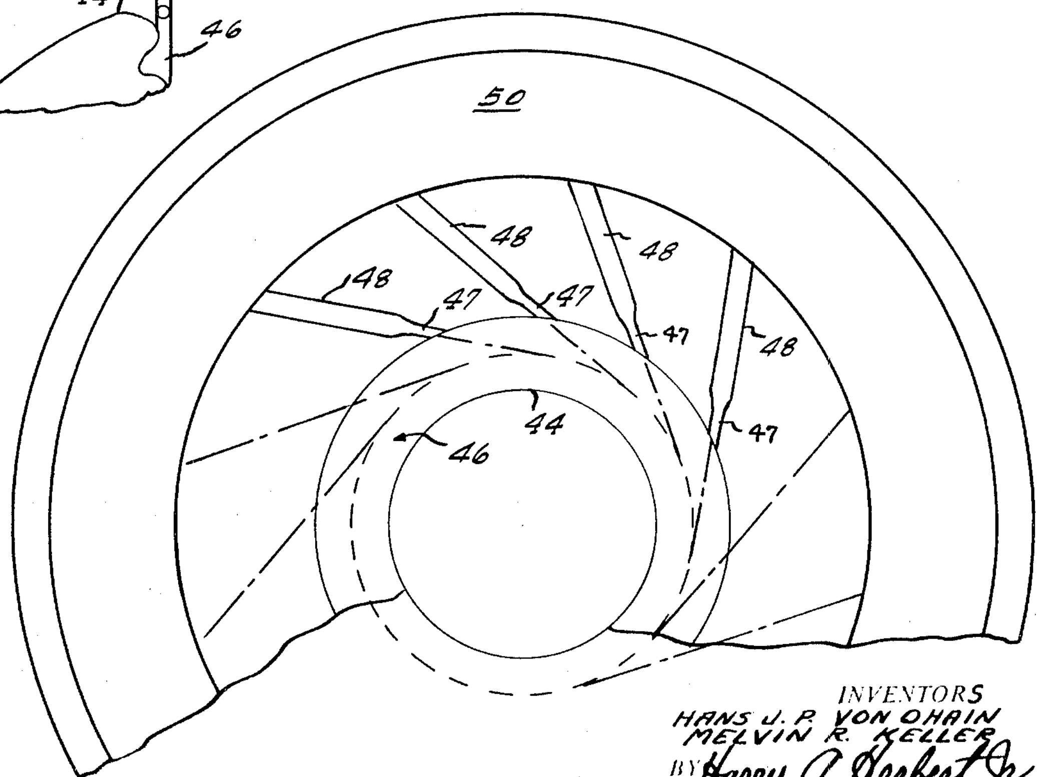
FIG. 9 is a schematic of the nozzle injection system adjacent the exit nozzle taken at right angle to the showing in FIG. 8.

FIG. 8 illustrates a preferred construction of the portion of FIG. 1 constituting the nozzle 4 and wall 5 along the expellant gas ejecting means associated therewith. In this Figure the nozzle throat is indicated by the reference numeral 44 and through which the vortex core emerges in the same manner as the device of FIG. 1. Immediately behind the nozzle throat 44 is a re-entry portion 46 which permits discharge from nozzle jets 47 to readily turn and follow the inner wall 55 of the reactor chamber C corresponding to the wall 5 of the device of FIG. 1. Each of the individual nozzles 47 forms a circumferential row and is adapted to be fed by radial and tangential extending passages 48 which, in turn, connect to a manifold space 50 adapted to in turn be connected to the regenerative cooling supply of expellant gas. The tangential arrangement of passages 48 and nozzles 47 is readily seen by inspection of FIG. 9. Further rows of nozzles 47 and connecting passages 48 are formed upstream in the spaced positions as indicated in the figure providing adequate flow of high velocity gas over the portion of the reactor chamber wall in question.

In the device of FIG. 1 and its variants, the charge of finely divided reactive material can be loaded into the reactor cavity C by first turning on the flow of hydrogen expellant gas which will produce a vortex flow within the cavity with a resultant low pressure zone adjacent the spin axis. By lowering a probe (not shown) into the cavity, connected by a conduit to suitable storage compartments for fissionable material, the reactive material can be transferred to the reactor chamber C. By connecting the probe and conduit through suitable valving to an exterior centrifugal separator, the reactive material can be withdrawn from the chamber C and separated externally from the expellant gas. The recovered reactive material can be stored in two or more shielded storage containers so as to avoid a critical mass. The probe is constructed so as to be readily inserted into the reactor cavity or withdrawn to an inactive position.

We claim:

1. A gas core nuclear reactor wherein a light gas is heated by diffusing it through a heavy fuel, comprising: an outer pressure shell enclosing a moderator body member which surrounds a central cavity forming a reactor chamber having a central axis, an outer radius, a front wall and a substantially flat backwall; said chamber cavity having a maximum radius $R_o$ and a length $L_1$ along its central axis and a length $L_2$ at its outer maximum radius wherein $L_2<0.5L_1$ and also $L_2<0.5_0$; an exit nozzle at the end of said chamber adjacent the front wall and having a narrow throat section with a throat radius $R_1<<L_1$ said front wall having a portion with a convex increasing radius; means for providing a critical mass of fine nuclear particles within said chamber; means for providing a tangential flow of hydrogen gas into said chamber to provide a vortex flow of gas and nuclear particles within said chamber; said chamber having a secondary gas flow outwardly along the front wall rearwardly along the outer maximum radius, inwardly along the back wall and forward along the axis; and means for directing a flow of gas along the front wall of said cavity to prevent the flow of nuclear particles toward the nozzle along the boundary layer of the wall of said chamber adjacent said nozzle.

2. The device as recited in claim 1 wherein said means for providing a tangential flow of hydrogen gas to said chamber comprises a circumferential ring of swirl vanes positioned within said chamber and forming an annular manifold surrounding said chamber; means positioned between each pair of swirl vanes for splitting the flow of gas between the vanes; and means for supplying high pressure hydrogen gas to said annular manifold.

3. The device as recited in claim 2 wherein a passage means, for hydrogen gas, is provided at each end of said swirl vanes for directing a flow of gas along the wall of the chamber to prevent contact of the reactive materials with said walls.

4. The device as recited in claim 2 wherein a circumferential row of flow splitters are positioned adjacent said swirl vanes for directing a flow of gas along the wall of the chamber to prevent contact of the reactive materials with said walls.

5. The device as recited in claim 2 wherein said means for directing a flow of gas along the front wall of said cavity comprises a plurality of gas nozzles means spaced in annular rows along the front wall for providing a tangential component of flow of hydrogen gas within said chamber and means for supplying high pressure hydrogen gas to said nozzles.

6. The device as recited in claim 5 wherein the front and back walls of said chamber have stepped portions and wherein gas nozzles are provided adjacent each stepped portion of the front and back walls of said chamber.

7. The device as recited in claim 1 wherein said means for providing a tangential flow of hydrogen gas comprises a ring member having a plurality of circumferentially positioned nozzles for directing a substantially tangential flow of gas from each nozzle and ramp means positioned in line with each of said nozzles for directing the gas flow away from said ring member, and means for supplying high pressure gas to said nozzles.

8. The device as recited in claim 1 wherein said means for providing a tangential flow of hydrogen gas to said chamber comprises a circumferential ring of ramp means for providing a rotational flow to the gas within said chamber; means positioned between each pair of ramp means for splitting the flow of gas between the ramp means; said ramp means having curved surfaces meeting along a common tangent line whereby the flow from one side of each flow splitting means along one curved surface of each ramp means is directed to flow in the same direction as the flow of gas from the other side of the next adjacent flow splitting means along the other curved surface of each ramp means.

* * * * *